June 6, 1944.        J. L. J. MARETTE ET AL        2,350,786
SOUND REPRODUCING UNIT FOR SOUND-FILMS
Filed April 22, 1942
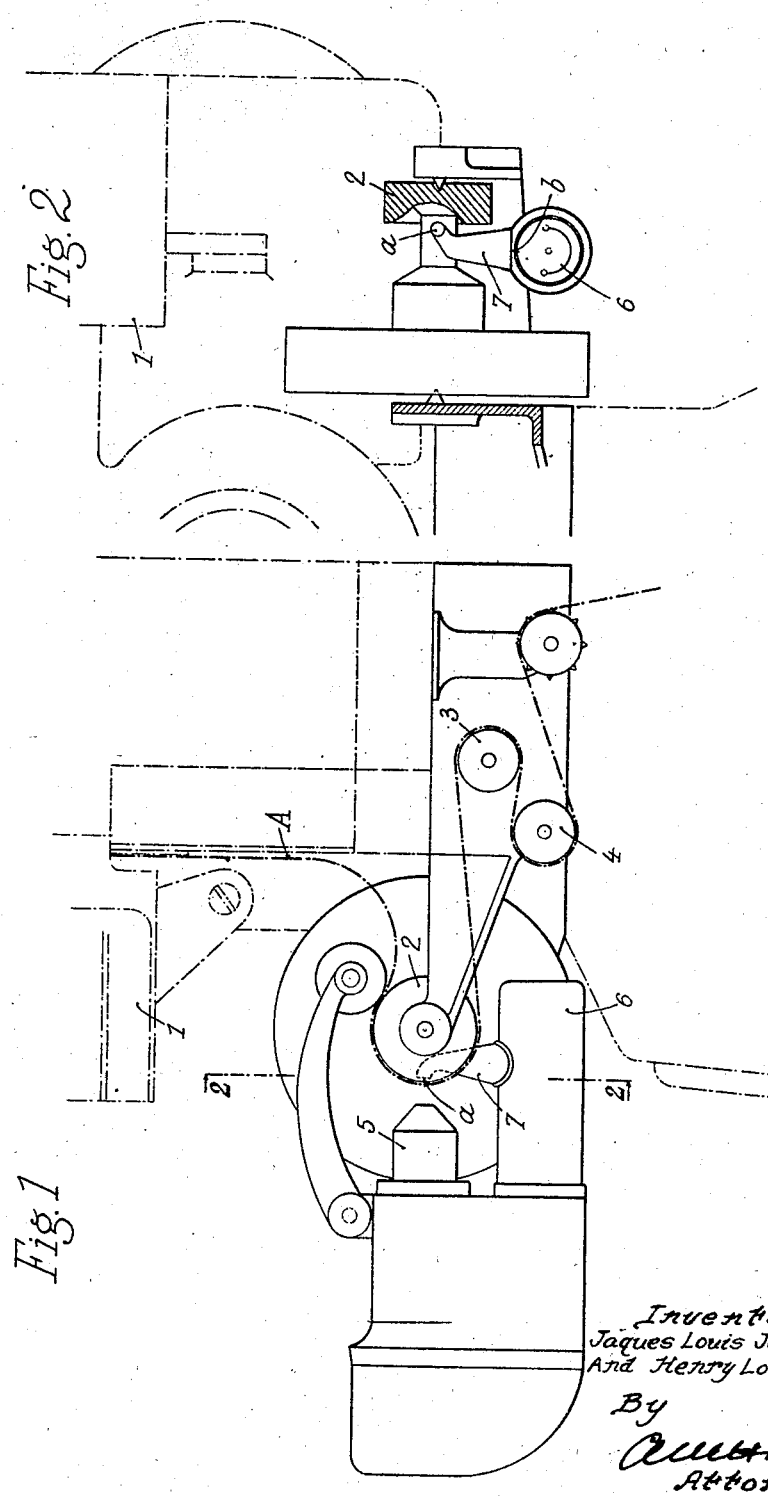
Inventors
Jaques Louis Joseph Marette
And Henry Louis Burnat
By
Attorney.

Patented June 6, 1944

2,350,786

UNITED STATES PATENT OFFICE 2,350,786

SOUND REPRODUCING UNIT FOR SOUND FILMS

Jacques Louis Joseph Marette, Saint Germain en Laye, and Henri Louis Burnat, Paris, France; vested in the Alien Property Custodian Application April 22, 1942, Serial No. 440,102
In France April 24, 1941

2 Claims. (Cl. 179—100.3)

The present invention relates to an optical device applicable to sound reproducing units for sound films.

It is known that the reproduction of sound on a film on which is photographically inscribed a sound-track necessitates the use of the following members:

1. A projecting device, which is intended to form on the part of the film occupied by the sound-track, a luminous reproducing line, at right angles to the direction in which the film continuously unwinds.

2. A photo-electric cell, which receives the luminous beam emitted by the preceding device after passing over the sound-track, and which transmits to an amplifying system the electric currents generated by the luminous modulations, said currents thus amplified being then sent to loud-speakers.

Up to now, for allowing the photo-electric cell to receive the totality of the amount of light emitted by the reproducing line, said cell was placed either near the film, or at a more or less great distance therefrom, by using, in this latter case, mirror devices or prisms causing the luminous reproducing beam to follow a broken line, function of the general diagram of the apparatus, so that the light finally falls on the photo-electric cell.

This latter arrangement allows of placing said cell at the most favorable place, as well as regards the technical operation, as concerning the general aspect of the whole of the apparatus.

However, when the light beam must be subjected to a plurality of reflections, a somewhat important complication of the construction and appreciable losses of light result therefrom.

The present invention is intended to give greater facility in carrying out the apparatus, by allowing the light beam to follow, between the film and the cell, any path whatever, broken or curved.

For that purpose and according to the invention, between the sound-track of the film and the photo-electric cell, is interposed a solid or hollow glass block, having polished lateral faces the two terminal faces of said block being perpendicular to the optical axis of the beams passing through them and serving one for the admission, the other for the issue of the light beam, the lateral faces being silvered and arranged in such a manner as to avoid any backward return of the light, so that, apart from the slight losses by absorption or reflection, any amount of light which enters through the inlet face issues entirely through the outlet face.

A simple arrangement consists in using a solid glass cylinder, the two terminal circular bases of which are polished and transparent, whereas the cylindrical portion is polished and silvered, the generatrices of said cylinder having the desired curvature for causing the light to follow the required path.

Use can be made of a prismatic, truncated, pyramidal or like glass block, incurved in the same manner.

It will be seen that with such a device, and provided certain limits are not exceeded, the light beam can be caused to follow any desired path to reach the cell.

This device allows, for instance, in the case of cinematographic sound apparatus, of placing the photo-electric cell at the most favorable place.

In particular, in projectors of under-standard dimensions, in which, owing to the smallness of the images, between the image and the sound only a very small length of film is available resulting from the offsetting of 25 images, it becomes easier to find a place for the sound head by the side of the image projector, whilst maintaining a sufficient space between the members for allowing the easy charging of the apparatus.

Instead of employing a cylindrical glass block with silvered lateral faces, use can be made of a polished block of transparent material the refractive index of which does not allow the lateral issue of the light rays, such for instance as the synthetic product mainly made of methyl methacrylate, commonly called "plexi-glas."

In the accompanying drawing, which shows, by way of example, an embodiment of the invention:

Fig. 1 is a view in elevation of the sound-reproducing unit according to the invention.

Fig. 2 is a cross section thereof according to line 2—2 of Fig. 1.

Referring to the drawing, it will be seen that A designates a sound-film which, after having passed through the image projecting apparatus 1, passes around a drum 2 and guiding rollers 3, 4. A projection device 5 forms on the sound-track of the film A a luminous reproducing line, which must be received on a photo-electric cell.

According to the invention, said cell 6 is placed at the most convenient place as regards the construction of the apparatus, and between the film and the cell 6 is interposed a glass block 7, having the features previously described.

In the example illustrated, said block is truncated. Its inlet face $a$ and its outlet face $b$ are perpendicular to the optical axis of the incident and emergent beams. The axis of the truncated cone is first bent so as to guide the light radially relatively to the drum 2 to inflect it downwardly (Fig. 1) and it is bent a second time to direct the light laterally out of the drum 2, then towards the photo-electric cell 6.

A special feature of the present arrangement resides in the fact that the drum 2 constitutes a supporting surface for the section of film in its passage before the exposure aperture of the projector. The guiding rollers 3, 4 are adjusted or positioned so that the edge of the film carrying the sound track extends beyond the edge of the drum 2. This exposure of the sound track to the light from the projection device 5 is a feature which permits the projection of the sound reproducing track onto the photo-electric cell.

Another feature of the reproduction apparatus is having one of the terminal faces of the block of transparent material extend inside the hollow drum 2 so as to be able to receive the light that is passed through the film.

It is these features that greatly contribute to the practicability of our invention as applied to projectors of under-standard dimensions.

Of course, the embodiment illustrated is only given by way of example.

Having now described our invention, what we claim as new and desire to secure by Letters Patent is:

1. In a sound reproducing apparatus in combination a projection device having a film gate provided with an exposure aperture, a hollow drum positioned with a radius coinciding with the optical axis of the projection device, guiding means for causing a film having a sound track to pass over said drum with the edge of the film carrying the sound track projecting beyond the edge of the drum, a photo-electric cell spaced from said drum, and a block of transparent material having two terminal faces directed respectively towards the exposure aperture and the photo-electric cell, the terminal face directed towards the exposure aperture being normal to the optical axis and located behind the projecting edge of the film, the lateral faces of the block being provided with bends to direct the light from the inside contour of the drum to the photo-electric cell.

2. In a sound reproducing apparatus as claimed in claim 1, wherein the block of transparent material has such a refractive index as not to allow the issue of light through its lateral faces.

JACQUES LOUIS JOSEPH MARETTE.
HENRI LOUIS BURNAT.